J. R. BARNES.

Washing-Machine.

No. 6,671. Reissued Oct. 5, 1875.

Witnesses

John Moody
Jas A. Mahone

Inventor

Josiah R Barnes

N. PETERS, PHOTO-LITHOGRAPHER, WASHINGTON, D. C.

UNITED STATES PATENT OFFICE.

JOSIAH R. BARNES, OF ELIZABETH, NEW JERSEY.

IMPROVEMENT IN WASHING-MACHINES.

Specification forming part of Letters Patent No. 161,854, dated April 13, 1875; reissue No. 6,671, dated October 5, 1875; application filed July 7, 1875.

*To all whom it may concern:*

Figure 2:
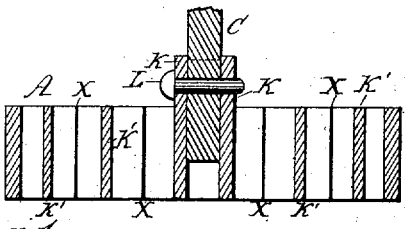
Figure 1:
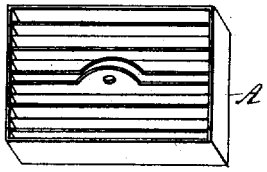

Be it known that I, JOSIAH R. BARNES, of the city of Elizabeth, county of Union and State of New Jersey, have invented a Clothes-Washing Machine, of which the following is a specification:

The object of my invention is the washing of clothes rapidly and easily, and with the least possible injury to the fabric, by means of two pounders, more or less, shown at Figure 1 and Fig. 2 in the drawing, made of thin slats, part of the slats being of wood and part metallic. Fig. 2 is a sectional view. Sufficient metallic slats are used in making them the desired weight, to cause them to sink in any depth of water, when, if constructed entirely of wood, they would float. This weight is absolutely necessary, in order to overcome the resistance of the water, and give a decided and effectual blow to the clothes in the tub B. These pounders, by falling, drive the water through the clothes with such force as to cleanse them thoroughly and quickly. The pounders are hung loosely to the uprights C C, Fig. 3, by a pin, or its equivalent, so as to accommodate themselves to any unevenness in the surface of the clothes.

Figure 4:
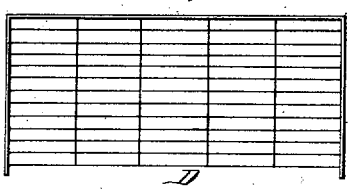

The pounders are more specifically described as follows: They are constructed of a framework of wood, or its equivalent, A, Fig. 1, of the dimensions and shape required for the machine for which they are intended, and of a thickness to give them sufficient strength, and three inches, more or less, high. Into this frame two wood slats, K K, or their equivalents, are framed just far enough each side of the center, to admit the thickness of the upright shaft C between them, or otherwise to be attached to them. This upright shaft is attached to these center slats by a pin, L, or its equivalent, through a rounded elevation in the center, or otherwise. Between these center slats and the frame, on each side, are inserted thin slats of wood K′ K′ and metal *x x*, alternately, or otherwise more or less in number, according to the size and weight required, and of the shape required for the machine for which they are intended, and with a false bottom, D, shown in Fig. 4 of the drawing, for the tub, made of narrow slats, so constructed as to give the water free circulation under them.

By this device the work is greatly facilitated as the clothes at the bottom are cleansed as thoroughly and quickly as those on the top.

Figure 3:
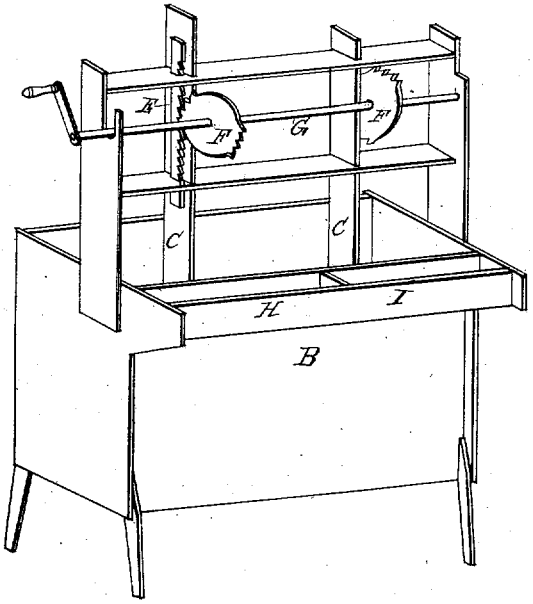

The pounders are raised to the same distance from the top of the clothes on which they rest, whether there are few or many in the tub, by means of a straight line of cogs, E, Fig. 3, shaped somewhat like saw-teeth, attached to the sides of the uprights, so that the bearing is over the center of the weight to be raised, thereby reducing the friction to a minimum, into which cogs on wheels F F match. There are two sets of cogs on each wheel on opposite sides, and the wheels are set on the shaft G, so that the cogs stand at right angles. The cog-gearing is so constructed as to be self-regulating, self-adjusting, and always in position without pins or other devices to regulate the fall of the pounders. The cogs on the wheels are so shaped and spaced that, in revolving the wheels by the crank, one set of cogs will raise an upright and pounder to a given height, and as they play off or let go, and the upright and pounder fall, the cogs on the other wheel catch, whereby a steady and easy motion is insured in working the machine, and four blows, two by each pounder, are given for every revolution of the shaft.

There may be more or less cogs in a set on the wheels; but they must occupy a given space one-eighth the circumference of the wheel. If spaced for twenty-four cogs there must be three in a set; if for thirty-two, four in a set.

The running-gear may be made of any suitable metal or of wood.

The extension on the side of the tub is designed (H) for attaching a wringer, I, for a soap-box.

What I claim as my invention is—

The combination, in a clothes-washing machine, of the pounders constructed of slats of wood and metal, with the self-adjusting and self-regulating cog-gearing E and F F, the uprights C C, and the shaft G with the bottom of narrow slats, as shown and described.

JOSIAH R. BARNES.

Witnesses:

JOHN MOODY,

JAS. A. MAHONE.